United States Patent [19]

Nidola et al.

[11] 4,037,032
[45] July 19, 1977

[54] ELECTRIC STORAGE BATTERY WITH VALVE METAL ELECTRODES

[75] Inventors: Antonio Nidola, Milan, Italy; Vittorio de Nora, Nassau, Bahamas; Placido M. Spaziante, Milan, Italy

[73] Assignee: Diamond Shamrock Technologies S.A., Geneva, Switzerland

[21] Appl. No.: 683,544

[22] Filed: May 5, 1976

[51] Int. Cl.² .......................................... H01M 6/16
[52] U.S. Cl. ................................. 429/198; 429/199; 429/210; 429/218
[58] Field of Search .................. 429/198–200, 429/210, 218

[56] References Cited

U.S. PATENT DOCUMENTS

| | | | |
|---|---|---|---|
| 2,631,115 | 3/1953 | Fox | 429/219 |
| 3,093,514 | 6/1963 | McCallum | 429/218 X |
| 3,410,785 | 11/1968 | Clough et al. | 429/218 X |
| 3,711,385 | 1/1973 | Beer | 204/290 F X |
| 3,846,273 | 11/1974 | Bianchi et al. | 204/290 F |

Primary Examiner—C. F. LeFevour
Attorney, Agent, or Firm—Hammond & Littell

[57] ABSTRACT

Electric storage batteries with titanium or other film forming metal anodes and cathodes are provided. The anodes are coated with mixed oxide coatings of a film forming metal oxide containing a platinum group metal oxide catalyst, which coatings may contain oxides of other metals to alter the breakdown voltage and increase the oxygen overpotential of the cathodes while preserving a low bromine and chlorine overpotential. The cathodes may be uncoated titanium or other film forming metals or film forming metals with a silver coating thereon. Bipolar film forming metal cathodes and anodes are provided carrying a mixed oxide coating on the cathodic face and either no coating or a silver coating on the anodic face. The invention is applicable to all types of electric storage batteries, either primary or secondary, and multiple batteries may be connected in series or in parallel to provide the desired amperage and voltage characteristics.

28 Claims, 3 Drawing Figures

ELECTRIC STORAGE BATTERY WITH VALVE METAL ELECTRODES

This invention relates to the use of a film forming metal, such as titanium, as anodes and cathodes in primary and secondary electric storage batteries.

The use of titanium alloys in the cathodes (negative electrodes) of electric batteries has been suggested in U.S. Pats. Nos. 3,093,512, 3,093,513 and 3,093,514, and the use of titanium carrying a platinum or palladium metal coating has been suggested by J. B. Cottom and I. Dugdale in a paper entitled "A Survey of Possible Uses of Titanium in Batteries", published in Proceedings of the 3rd International Symposium on Batteries, held at Bournemouth, England in 1962, published by The MacMillan Company, New York, 1963. Platinum or palladium metal coated titanium cathodes, however, do not have a satisfactory life in batteries and because of their short life and the cost of platinum group metal coatings, they are too expensive to use in batteries.

The use of titanium coated with a chemically inert conductor ($MnO_2$) as a battery electrode is described in U.S. Pat. No. 2,631,115. The construction and operation of zinc bromide electric batteries is described in U.S. Pats. Nos. 3,285,781, 3,328,202, 3,578,503, 3,806,368 and 3,816,177 and other patents referred to therein. For various reasons, these patents leave the problem of using titanium as the anodes (negative pole) and/or anodes (positive pole) of primary or secondary electric storage batteries, and particularly batteries containing bromide electrolytes, still not satisfactorily solved.

The anodic film which forms on titanium and other film forming metals, such as tantalum, zirconium, niobium, tungsten, ythrium, and alloys thereof, gives these metals the capacity to conduct electric current in the cathodic direction and to resist the passage of current from the anodic direction. This film also protects these metals from the corrosive effect of the electrolyte and the reactions involved in charging and discharging batteries and, in theory, these metals should be of outstanding usefulness in electric storage batteries.

Because of their film forming characteristic and the ability to conduct current in one direction and to impede passage of current in the opposite direction, these metals are referred to as "film forming metals" or as "valve metals."

We have found that when these film forming metals are freshly cleaned and the cleaned surfaces are coated with an electrically conducting electrocatalytic mixed oxide coating containing a platinum group metal oxide, such as described in U.S. Pats. Nos. 3,632,371, 3,711,385 and 3,846,273 and British Pat. No. 1,231,280, they will continue to conduct current to and from an electrolyte in a primary or secondary electric storage battery and to catalyze halogen and/or oxygen discharge from the electrode face over long periods of time without becoming passivated or inactive.

Unexpectedly, these mixed oxide coatings are not removed from titanium base cathodes under battery operation in either charging or discharging cycles.

These mixed oxide coatings are much less expensive than titanium coated with platinum metal or special alloys of titanium.

We have found that mixed oxide coated commercially pure titanium (c.p. titanium) may be used as cathodes (negative poles) of an electric battery and that uncoated c.p. titanium or silver coated titanium may be used as anodes (positive poles) in such batteries. The mixed oxide coatings and the methods of applying such coatings to titanium or other film forming metal bases described in U.S. Pats. Nos. 3,632,371, 3,711,385 and 3,846,273 and British Pat. No. 1,231,280 are incorporated in this application and by reference to said patents are made a part of this application. These patents will hereinafter be referred to as "said patents."

For many uses, the weight of an electric storage battery is a prime consideration in its design and construction. This is particularly true of batteries for use in aeroplanes, automobiles, space vehicles, space technology and other uses, and weight per unit of electrical capacity is important in all fields. Titanium and other film forming metals when used as electrodes in electric storages batteries have the advantage of a high strength to weight ratio, resistance to corrosion, higher breakdown voltage of the oxide film thereon, and other advantages, but for successful use must possess certain properties useful in storage battery construction, dependent upon the reactants in the electrochemical system of the battery, the electrochemical changes which take place in charging, discharging and recharging the battery, the type of electrolyte used, the field of use of the battery, and other characteristics.

One of the objects of this invention is to provide storage batteries with film forming metal base electrodes having a mixed oxide coating as described in said patents, which will operate satisfactorily in various types of primary and secondary electric storage batteries and with different chemical or electrolyte systems.

Another object is to provide titanium cathodes for storage batteries which will have a breakdown voltage in the presence of the electrolyte used, which will be sufficiently above the decomposition potential of the chemical compounds present in the electrolyte, to provide a sufficient safety factor for commercial use.

Another object is to provide mixed oxide coated titanium cathodes (negative poles) for use in batteries using metal halide electrolytes, such as sodium bromide or zinc bromide, cadmium bromide, calcium bromide, aluminum bromide and other type electrolytes or other bromide electrolyte systems and bromine.

Another object is to provide titanium electrodes for electric batteries which will have the minimum titanium thickness necessary to support the coating in proper adherence thereon and to provide a greater length of useful life.

Another object is to provide titanium cathodes with mixed oxide coatings thereon for electric batteries which will have the proper degree of macro roughness and micro roughness for adequate adherence of the coating to the titanium cathode base and sufficient electrocatalytic sites to continue to function as cathodes (negative poles) of batteries over long periods of time.

Another object is to provide titanium anode with a surface upon which metals deposited on the anode during charging of the battery will have satisfactory morphology, uniform thickness and freedom from dendrites.

Another object is to provide storage batteries with titanium electrodes (anodes and cathodes) of light weight per unit of power storage and generation, for storing power for use in electric generating plants for emergency supplemental service.

Another object is to provide electric storage batteries with titanium bipolar electrodes having a mixed oxide coating containing a film forming metal oxide and a platinum group metal oxide on the cathodic face (negative pole) and a coating of silver on the anodic face (positive pole) of a battery.

Various other objects and advantages of this invention will be apparent as this description proceeds.

Referring now to the drawings.

Figure 1:
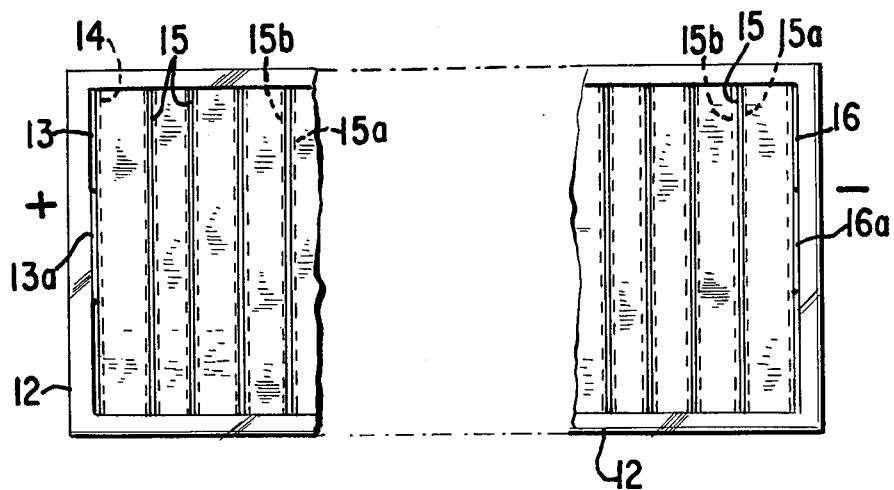
FIG. 1 is a plan view intended to illustrate an embodiment of a typical primary or secondary storage battery which, as is understood in the art, may take many forms dependent upon its field of use, its chemical and electrochemical system, etc.
Figure 2:
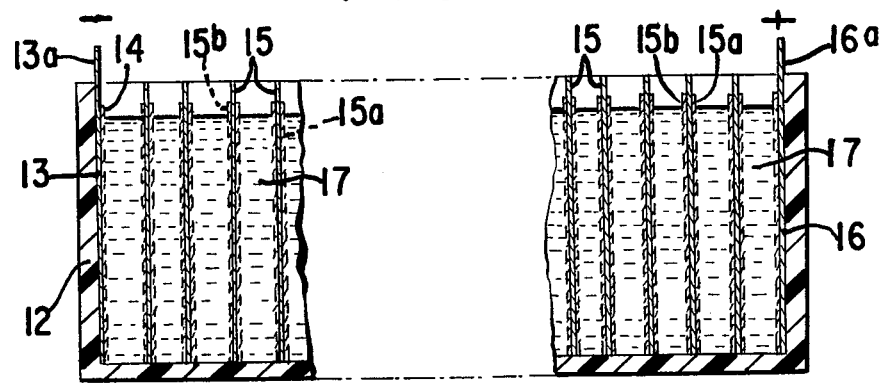
FIG. 2 is a cross section view of FIG. 1.

In FIGS. 1 and 2, a typical battery enclosure or casing 12 of insulating material such as hard rubber, plastic, glass, coated metal or the like is shown. The casing 12 may be of any desired shape, such as rectangular, cylindrical, cylindrical with concentric anodes and cathodes, angular and for small primary dry cell batteries, such as pace makers, hearing aids, etc., wafer shape. A suitable cover (not shown) to prevent or permit the escape of gas or to prevent the escape of electrolyte from the battery may be provided.

Inside casing 12, an cathode end plate (negative pole) 13 of titanium or other film forming metal, provided with a suitable conductor attachment terminal 13a and having thereon a mixed oxide coating 14, as described in said patents, is provided at one end of the enclosure box 12. A plurality of intermediate bipolar electrodes 15 of titanium or other film forming metal are provided in the enclosure 12 and a terminal anode 16 of titanium or other film forming metal provides the positive pole for the battery. A suitable conductor attachment terminal 16a is provided for cathode end plate 16.

The cathode end plate 13 and bipolar electrodes 15 have a mixed oxide coating 15a as described in said patents on the cathodic face, and the anodic face 15b of bipolar electrodes may be either uncoated titanium or other film forming metal or the anodic face 15b may be provided with a silver metal coating of a thickness of about 1 micron, the purpose of which will be described later.

The electrolyte 17 between the electrodes may be a liquid electrolyte or a solid adsorbent material, such as activated carbon, porous carbon, graphite felt, chelating agents, organic ammonium quaternary salts, quaternary ammonium polyhalides or other material capable of adsorbing, storing and releasing the electrolyte or the components of the electrolyte such as halogens or other liquids or gases in the electrolyte during the charging or discharging of the battery. Separators (not shown) inert to the electrolyte and the active components of the cell, but porous to the passage of ions to permit ionic current flow therethrough, may optionally be provided between the anodic and cathodic faces of the electrodes in each cell unit. Suitable separators may be nylon, polyesters, such as porous polypropylene, asbestos, modified asbestos, perm-selective membranes or ion exchange material, or any other ionically conducting membrane which prevents flow of electronic current but permits the flow of ionic current between the anode and cathode plates.

The battery enclosed in casing 12 may be connected in series or in parallel, to provide the voltage or amperage desired and the intermediate bipolar electrodes may be omitted and only the terminal electrodes 13 and 16 used, if desired.

Figure 3:
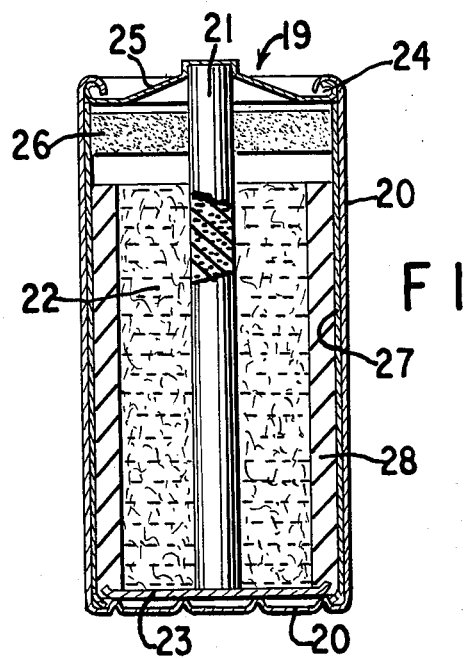
FIG. 3 illustrates a typical dry cell battery containing the improvement of this invention.

FIG. 3 illustrates a dry cell battery 19 in which the outer casing cylinder, or can 20 and bottom are formed of titanium or titanium with a thin silver coat on the interior; the center electrode 21 is titanium provided with a mixed oxide coating as described in said patents. Conducting terminals may be provided on the casing bottom 20 and on the center electrode 21, or if the battery is to function in a flashlight, radio or other apparatus which carry their own terminal connections the battery construction may be as shown in FIG. 3. Other terminal connections may be provided on the top of can 20 and electrode 21 if the battery is to be used for services where these terminal connections are needed.

The cathode mix 22 may be any suitable battery mix, such as maganese dioxide-carbon, $Zn/NH_4Cl$, $ZnCl_2/MnO_2$, C; $ZnKOH/HgO$; $Zn/KOH/MnO_2$; $Zn/ZnSO_4Hg$ dioxysulfate; $ZnKOH/AgO$; $Zn/ZnCl_2AgCl$ or other dry cell battery mix. A paper bottom washer 23 is provided at the bottom of the cell and an air space 24 is provided at the top. The top plate 25 may be crimped onto the casing cylinder 20 or otherwise sealed thereto and a pitch or asphalt seal 26 is provided to prevent leakage from the battery. A laminated paper separating tube 27, an electrolyte paste 28 jelled with corn starch and wheat flour separates the battery mix 22 from the titanium cell can 20.

The oxide coatings on the cathodes as described in said patents may contain a mixture of titanium dioxide and a platinum group metal oxide such as ruthenium dioxide and may contain oxides of other metals as doping agents or to impart special properties to the cathode coatings for increasing the conductivity and breakdown voltage of the oxide film on the titanium or for other purposes. A particularly effective coating comprises 45 to 65% of titanium dioxide, 30 to 35% of ruthenium dioxide, 1 to 20% of stannous oxide and 1 to 5% of cobalt oxide, the said percentages being based on the weight of the metals in said oxides. In some instances the coating may contain a platinum group metal oxide alone.

COATING NO. 1

Tianium trichloride in HCl solution is dissolved in methanol, the $TiCl_3$ is converted to the pertitanate by the addition of $H_2O_2$. This conversion is indicated by a change in color from $TiCl_3$ (purple) to $Ti_2O_5$ (orange). An excess of $H_2O_2$ is used to insure complete conversion to the pertitanate. Sufficient $RuCl_3 \cdot 3H_2O$ is dissolved in methanol to give the desired final ratio of $TiO_2$ to $RuO_2$. The solution of pertitanic acid and ruthenium trichloride is mixed and the resulting solution is applied to a cleaned titanium battery cathode surface, which had been cleaned by boiling in a 20% solution of hydrochloric acid at a reflux temperature of 109° C for 20 minutes, by brushing or spraying. The coating is applied as a series of coats with baking at about 350° C for 5 minutes between each coat. After a coating of the desired thickness or weight per unit of area has been applied, the deposit is given a final heat treatment at about 450° C for 15 minutes to 1 hour. The molar ratio of $TiO_2$ to $RuO_2$ may be varied from 1:1 $TiO_2 : RuO_2$ to 10:1 $TiO_2 : RuO_2$. The molar values given above corresponded to 22.3:47 weight percent Ti : Ru and 51:10.8 weight percent Ti : Ru.

COATING NO. 2

A coating consisting of:

|  | mg/cm² (metal) | Weight % Metal |
| --- | --- | --- |
| Ruthenium as RuCl₃ . 3H₂O | 1.60 | 45% Ru |
| Cobalt as CoCl₂ . 6H₂O | 0.036 | 1% Co |
| Tin as SnCl₄ . 5H₂O | 0.142 | 4% Sn |
| Titanium as 15% TiCl3 solution (commercial | 1.78 | 50% Ti | was applied to a cleaned titanium base which had been cleaned by boiling at a reflux temperature of 109° C in a 20% solution of hydrochloric acid for 20 minutes.

The coating was prepared by first blending the ruthenium, cobalt and tin salts in the required amount. TiCl₃ solution (15% as TiCl₃ in commercial solution) was then slowly added under stirring. After the salts were completely dissolved, a few drops of hydrogen peroxide (H₂O₂, 30%) were added, sufficient, to make the solution turn from the blue of the commercial TiCl₃ solution to the brown-reddish color of a peroxyhydrate or pertitanate compound.

At the end a few drops of isopropyl alcohol were added to the solution after cooling. The coating, thus prepared, was applied to the working side of a battery cathode exposed to the electrolyte by brushing or spraying in 10 to 14 subsequent layers. After applying each layer, the cathode was heated in an oven under forced air circulation at a temperature between 300° and 400° C for 5 to 10 minutes, followed by fast natural cooling in air between each of the first 10 to 14 layers and after the last coat was applied the cathode was heated at 450° C for 1 hour under forced air circulation and then cooled.

Any compatible electrochemical and electrolyte system, either acid or alkaline, may be used in the batteries 12 and 19, but for the purpose of specific illustration, and only for the purpose of illustration, a system based upon the use of sodium or zinc bromide will be used as the illustrative embodiment hereinafter described. The sodium bromide electrolytes may contain 150 to 300 gpl of NaBr and the zinc bromide electrolytes may contain from 20 to 200 gpl ZnBr. The electrolyte may be liquid, solid, paste, jelled and in some cases gaseous.

BREAKDOWN VOLTAGE (BDV)

When titanium oxide coated cathodes are used for the release of bromine from battery electrolytes containing bromine, the breakdown voltage (BDV) of the insulative valve metal or film forming metal oxide film on the metal base is so near the electrode potential at which bromine is released that the use of commercially pure titanium anodes used for chlorine production, electrowinning, etc. is undesirable. The margin of safety of these cathodes for bromine release in a battery is too low for satisfactory commercial use.

The decomposition potential for bromine from sodium bromide, zinc bromide or other bromide containing electrolytes is 1.3 to 1.4 volts, whereas the breakdown voltage of commercially pure (c.p.) titanium for bromine release in bromine containing electrolytes is less than 2 V(NHE) at 20° C. This is probably due to a strong absorption of bromide ions on the cathode surface which causes a rise of internal stresses in the passive protective titanium oxide layer on the cathode surface; or the conversion of the colloidal continuous titanium oxide film into a crystalline, porous non-protective titanium oxide, or to an increase of the amount of the electron holes in the titanium oxide film which causes a decrease of the breakdown voltage; or the formation of Ti$^{III}$Br$_Y^{(Y-3)}$—complexes in the cathodic film which hydrolyze, producing free HBr, a strong corrosive agent for the titanium; or to a combination of two or more of these actions. Regardless of the reason, the low breakdown voltage which is very close to the decomposition potential for bromine does not permit the safe commercial use of commercially pure titanium for the cathodes of electric batteries having bromine containing electrolytes.

For battery electrodes in batteries containing and using bromide or bromine compounds, a titanium or tantalum base cathode having an electrocatalytic coating thereon containing a least one platinum group metal oxide, should have a breakdown voltage greater than 2 volts (NHE). Commercially pure titanium has a breakdown voltage in bromide containing electrolytes of less than 2 volts.

We have found that oxide coated cathodes of titanium alloys containing up to 5% by weight of tantalum, zinc, vanadium, hafnium or niobium, and tantalum and tantalum alloys show a breakdown voltage above 10 volts in sodium bromide, zinc bromide and other battery electrolytes, which make them excellent cathodes for use in batteries containing a bromine or bromide electrolyte system and that the breakdown voltage of commercially pure titanium base cathodes coated with a coating containing at least one platinum group metal oxide may be maintained above 2 volts (NHE) in a battery electrolyte system by adding minor amounts of additives to the battery electrolyte, such as 10 to 4000 ppm of a soluble salt of at least one metal of Groups IIA, IIIA, VA, VIIB and VIIIB of the Periodic Table. Examples of suitable salts of such metals are inorganic salts, such as the halides, nitrates, sulfates, ammonium salts, etc. of metals, such as aluminum, calcium, magnesium, cobalt, nickel, rhenium, technetium, arsenic, antimony, bismuth, gallium, iridium, and mixtures thereof, compatible with the battery system.

One of the preferred aqueous bromide electrolytes for use in batteries contains 10 to 4000 ppm of a mixture of salts of aluminum, magnesium, calcium, nickel and arsenic, and preferably, 500 ppm of aluminum, 1000 ppm of calcium, 1000 ppm of magnesium, 50 ppm of nickel and 100 ppm or arsenic, which increases the c.p. titanium anode breakdown voltage from about 1.3 to 1.4 to about 4.15 to 5.0 volts (NHE). This higher breakdown voltage makes the electrolyte in a battery having commercially pure titanium electrodes safe for commercial use under almost all conditions of battery use.

When oxide coated cathodes of commercially pure titanium as described in said patents are used in batteries containing an aqueous bromide electrolyte composition, during the charging cycle bromine evolution at the cathodes at 25° C occurs at a slightly lower cathode potential than oxygen evolution. The potential difference in a sodium bromide solution between the desired reaction:

  (1)

and the unwanted oxygen evolution reaction:

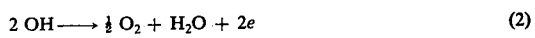  (2)

is about 300 mv at 10 KA/m² at a sodium bromide concentration of 300 g/liter. This difference decreases at higher temperatures, as the temperature coefficient for reaction (1) is more negative than for reaction (2).

The addition of the above-named metal ions to an aqueous bromide containing electrolyte system used in electric batteries appears to catalyze the formation of colloidal continuous titanium oxide films on the titanium under cathodic conditions, so that the oxide coated commercially pure titanium cathodes may be used in batteries without the protective titanium oxide film on the cathode being destroyed under a wide range of battery operating conditions.

Some of the elements able to increase the titanium breakdown voltage in batteries in their decreasing order of activity are:

Al < Ni, Co < Ca, Mg < Re, Tc < As, Sb, Bi.

When an aluminum salt, such as $AlCl_3$, is used as a battery additive, the breakdown voltage at 20° C in the electrolysis of an aqueous solution containing 300 g/liter of sodium bromide is close to 3.3 V(NHE), whereas at 80° C, it is slightly less or above 3.0 V(NHE). There is a threshold value for each element which corresponds to the maximum titanium breakdown voltage.

The effect of aluminum is increased by adding other salts including nickel and/or cobalt, calcium, magnesium, gallium, indium, arsenic, etc., which produce a synergistic effect. By using a mixture of aluminum (500 ppm) + calcium (1000 ppm) + magnesium (1000 ppm) + nickel (50 ppm) + arsenic (100 ppm) as additives in a sodium bromide electrolyte used in a battery, the breakdown voltage for the commercially pure titanium cathode bases is above 5.0 V(NHE) at 20° C and at 80° C, it is slightly less or above 4.5 V(NHE). In a zinc bromide electrolyte, the increase in breakdown voltage is of the same order.

Soluble inorganic compounds containing calcium, magnesium, rhenium, aluminum, nickel, arsenic, antimony, etc., in small amounts, increase the breakdown voltage of commercially pure titanium in the bromine containing electrolytes in a battery and sharply increase the value of the titanium breakdown voltage.

ILLUSTRATION 1

When an aqueous solution containing 300 g/liter of sodium bromide is electrolyzed at 20° and 80° C and a current density of 10 $KA/m^2$ in an electrolysis cell provided with a cathode and an anode of commercially pure titanium provided with a mixed coating of ruthenium oxide and titanium oxide, the breakdown voltages are as shown in the following Table I.

TABLE I

| Type | Additive Amount (ppm) | B.D.V. 20° C | (V(NHE)) 80° C |
|---|---|---|---|
| AlCl3 | 10 | 3.0 | 2.3 |
|  | 500 | 3.1 | 3.0 |
|  | 1000 | 3.3 | 3.0 |
| NiBr2 | 10 | 2.0 | 2.0 |
|  | 100 | 2.3 | 2.2 |
|  | 500 | 2.4 | 2.3 |
| CoBr2 | 100 | 2.4 | 2.3 |
| CaBr2 | 100 | 2.0 | 1.9 |
|  | 1000 | 2.2 | 2.1 |
|  | 2000 | 2.3 | 2.2 |
| MoBr2 | 4000 | 2.3 | 2.2 |
| (NH4)ReO4 | 10 | 2.0 | 2.0 |
|  | 50 | 2.1 | 2.0 |
| (NH4)TcO4 | 50 | 2.0 | 2.0 |
| As2O3 | 10 | 1.9 | 1.8 |
|  | 100 | 2.2 | 1.9 |
|  | 500 | 2.2 | 2.0 |
| Sb2O3 | 100 | 2.1 | 2.0 |
| Bi2O3 | 100 | 2.0 | 2.0 |
| Al(500) + Ca(1000) + Mg(1000) |  | 4.0 | 3.8 |
| Al(500) + Ni(100) + As(100) |  | 3.8 | 3.6 |
| Al(500) + Ca(1000) + Mg(1000) + Ni(100) + As(100) |  | 5.0 | 4.5 |

TABLE I-continued

| Type | Additive Amount (ppm) | B.D.V. 20° C | (V(NHE)) 80° C |
|---|---|---|---|
| Al(500) + Pyrrole(100) |  | 3.4 | 3.0 |
| Al(500) + Pyridine(50) |  | 3.1 | 3.0 |
| Al(500) + Butyl amine(100) |  | 3.2 | 3.1 |
| c.p. Titanium | — | 1.4 | 1.3 |

In an electrolysis similar to Illustration 1, without additives, except that the cathode base was not commercially pure titanium, but tantalum, or an alloy of titanium containing 5% by weight of niobium or an alloy of titanium containing 5% by weight of tantalum, the breakdown voltage was greater than 10 volts. A similar increase in the breakdown voltage of titanium or other film forming metal anodes and cathodes in primary or secondary electric batteries can be secured.

MINIMUM THICKNESS OF TITANIUM

We have found that when film forming metal base cathodes, such as c.p. titanium provided with mixed oxide coatings containing a platinum group metal oxide, as described in said patents, are used in storage batteries, the minimum thickness of the titanium base for coating and subsequent use in batteries must be equal to or greater than 0.4 mm; below 0.4 mm the adherence between the titanium and the mixed oxide containing coating at the titanium/coating interface is sharply lower than when the thickness of the c.p. titanium base is equal to or greater than 0.4 mm; also that during the thermal treatment used in fixing the mixed oxide coatings on the titanium base, the base is deformed and unless the titanium base anodes or cathodes retain their original shape and parallelity in the battery, there is premature failure in service.

While weight considerations alone would dictate the use of the thinnest possible titanium anodes and cathodes, the following tests show the importance of using a titanium cathode base thickness equal to or greater than 0.4 mm.

TEST NO. 1

Three samples of different thickness of commercially pure (c.p.) titanium were tested. Each specimen of a given test had a thickness of (a) from 1 to 1.5 mm, (b) from 0.4 to 0.5 mm, and (c) a thickness of 0.2 mm or less. The number of samples of each thickness (a), (b) and (c) tested was 10. In this test, the titanium samples in the form of solid rolled sheets 1 to 1.5 mm in thickness and in the form of rods were sandblasted before etching and were etched in 20 to 25% HCl w.t. according to the following Table. The sandblasting was for the purpose of increasing the macro roughness and the etch was for the purpose of increasing the micro roughness of the titanium sheets and rods. The samples having a titanium thickness of ≦ 1 to 0.4 mm were not subjected to sandblasting before etching, but were given a longer etch as shown by Table No. 2.

Table No. 1

| Etching Conditions For Ti 1.0 – 1.5 mm Thick | |
|---|---|
| HCl | 20 to 25% w.t. |
| Soaking Time | 10 to 20 minutes |
| Temperature | Boiling reflux temp. |

Table No. 2

| Etching Conditions For Ti 0.4 - 0.5 mm Thick | |
|---|---|
| HCl | 25% w.t. |
| Soaking Time | 50 to 60 minutes |
| Temperature | Boiling reflux temp. |

Table No. 3

| Etching Conditions For Ti ≦ 0.2 mm Thick | |
|---|---|
| HCl | 20% w.t. |
| Soaking time* | 8 minutes |
| Temperature | 109° C |

*Above 8 minutes, some holes penetrating the titanium sheets were observed.

The greater the degree of roughness, both macro and micro roughness, of the titanium base, the better the adherence of the oxide coating to the base, and in zinc-bromine batteries, the better the adherence of the zinc deposit at the Ti/Zn interface.

In zinc-bromide batteries using titanium cathodes coated with mixed oxides of the type described in said patents as cathodes and either non-coated or silver-coated titanium as the anodes, in the discharge cycle of said batteries in which the electrochemical system of the battery acts as a generator and the cathode is the positive pole, the reaction is as follows:

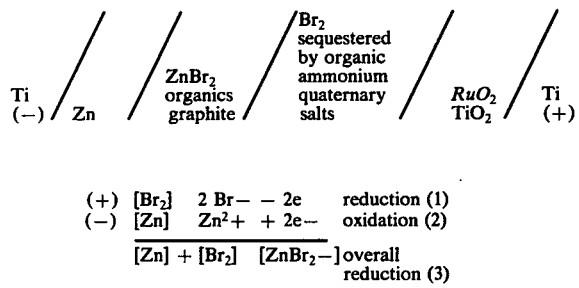

$$(+) \ [Br_2] \quad 2 Br- - 2e \quad \text{reduction (1)}$$
$$(-) \ [Zn] \quad Zn^{2+} + 2e- \quad \text{oxidation (2)}$$
$$[Zn] + [Br_2] \quad [ZnBr_2-] \text{ overall reduction (3)}$$

The graphite in the above battery composition absorbs the $ZnBr_2$ and prevents leakage from the battery and the coated Ti in the charging cycle conducts current to the battery electrolyte. In $ZnBr_2$ batteries, the mixed oxide coating on the titanium base of a thickness equal to or greater than 0.4 mm used for the cathode, provides satisfactory mechanical properties. There is no removal of the coating in either the charging or discharging cycles and no free titanium zones facin the corrosive $ZnBr_2$ electrolyte which would be subject to the low BDV of titanium in bromine evolution and no ohmic drop at the Ti/coating interface.

On the titanium anode, the high adherence between the base and the zinc deposited during the charging cycle provides a satisfactory zinc coating of low porosity and freedom from cracks or dendrites and no uncoated titanium zones facing the corrosive $ZnBr_2$ electrolyte and there is no ohmic drop at the Zn/Ti interface.

A titanium anode with a deposit of silver about one micron in thickness thereon produces a zinc deposit which is better in battery use than the zinc deposit on an uncoated titanium anode. The silver may be deposited on titanium anodes by electroplating or by chemideposition from a silver salt solution by a process similar to the chemideposition step described in said patents.

While the principles of this invention are particularly useful in primary and secondary electric storage batteries using bromide containing electrolyte systems, such as sodium bromide, zinc bromide, cadmium bromide, calcium bromide, aluminum bromide and other bromide or bromine containing systems or any battery from which zinc is deposited on the cathode, the principles of this invention may also be used in batteries employing zinc chloride, aqueous and non-aqueous lithium containing batteries, lithium sulfur batteries, alkaline batteries, lead acid batteries, solid state batteries, molten salt batteries and other types of batteries as will be obvious to persons skilled in the battery art. The anode may be a titanium base carrying paste anodic materials. In addition to bromide batteries such as zinc bromide batteries, the batteries may contain minor amounts of other zinc salts, such as zinc sulfate, zinc acetate, zinc chloride and other additives and modifiers.

We claim:

1. An electric storage battery comprising a casing, a cover, an aqueous bromide electrolyte containing a bromine sequestering agent, and at least one pair of a cathode and anode, the said cathode being a titanium base having an electrical conducting, electrocatalytic oxide coating thereon containing oxides of a metal selected from the group consisting of ruthenium, rhodium, palladium, osmium, iridium, platinum and mixtures thereof and mixed oxides of at least one of said metals and at least one film forming metal.

2. The electric battery of claim 1 containing a titanium base anode.

3. The electric battery of claim 1, which contains a silver-coated titanium base anode.

4. An electric storage battery according to claim 1, in which the titanium base, cathode is an alloy of titanium containing up to 5% by weight of a metal from the group consisting of tantalum and niobium.

5. The electric battery of claim 1, in which the cathode coating contains oxides of film forming metals, oxides of platinum group metals and oxides of other metals which modify the properties of the film forming metals and the platinum group metals.

6. The battery of claim 1, in which the coating contains a mixture of titanium dioxide and ruthenium dioxide.

7. The battery of claim 1, in which the coated titanium base has a breakdown voltage in excess of 2 V(NHE).

8. The battery of claim 1, in which the titanium base cathode has a minimum thickness of 0.4 mm.

9. The battery of claim 1, in which the titanium base cathode has a minimum thickness of 0.4 mm and a breakdown voltage in excess of 2 V(NHE).

10. The battery of claim 1, in which the coating contains 55 to 65% of titanium dioxide, 30 to 45% of ruthenium dioxide, 1 to 20% of stannous oxide and 1 to 5% of cobalt oxide, the said percentages being passed on the weight of the metals in said oxides.

11. The battery of claim 3, which is a primary storage battery.

12. The battery of claim 3, which is a secondary storage battery.

13. The battery of claim 3, in which the titanium anode has a coating of silver thereon.

14. The battery of claim 3, in which the electrolyte is a halide containing electrolyte from the group consisting of sodium halide, zinc halide, cadmium halide, calcium halide and aluminum halide.

15. The battery of claim 3, in which the electrodes between the terminal anode and the terminal cathode are bipolar valve metal electrodes having an electric conducting electrocatalytic coating comprising mixed oxides of a film forming metal and an oxide of a platinum group metal on the cathodic side and optionally a coating containing silver on the anodic side.

16. The battery of claim 6, in which the coating contains oxides of two or more metals from the group consisting of titanium, ruthenium, nickel and cobalt.

17. The battery of claim 7, in which the electrolyte is zinc bromide containing additives from the group consisting of aluminum, magnesium, calcium, nickel and arsenic in amounts of from 10 to 4000 ppm.

18. The battery of claim 7, in which the electrolyte is zinc bromide containing as additives soluble salts of at least one metal from Group IIA, IIIA, VA, VIIB and VIIIB of the Periodic Table in amounts of from 10 to 4000 ppm.

19. The battery of claim 14, in which the halide is a bromide.

20. The battery of claim 14, in which the electrolyte contains a liquid or solid adsorbent material for bromine.

21. The battery of claim 20, in which the adsorbent material is from the group consisting of activated carbon, porous carbon, graphite felt, chelating agents, organic ammonium quaternary salts and quaternary ammonium polyhalides and tetraethyl ammonium salts.

22. The battery of claim 15, in which the valve metal electrodes are titanium electrodes which have a minimum thickness of 0.4 mm and a breakdown voltage in excess of 2 V(NHE).

23. The battery of claim 15, in which the cathodes are titanium having an electric conducting electrocatalytic coating containing mixed oxides of titanium andruthenium thereon.

24. An electric battery capable of generating a persistant battery voltage and current, said battery including an electrolyte and a titanium electrode comprising an electroconductive substrate having thereon a conductive oxide of a platinum group metal, a reactant stored in electrical contact with said electrode, said reactant being capable of reacting with the electrolyte at the electrode interface to produce ions and promote current flow and a second electrode.

25. The battery of claim 24 wherein the reactant is a halogen.

26. The battery of claim 24 wherein the reactant is elemental bromine.

27. The battery of claim 24 in which the second electrode is uncoated titanium.

28. The battery of claim 24 in which the second electrode is titanium with a silver coating thereon.

* * * * *